(No Model.)

G. MOORE.
CORD ATTACHMENT FOR ARTIFICIAL LEGS.

No. 353,369. Patented Nov. 30, 1886.

Attest.
P. H. Costich
Owen G. Clark

Inventor.
George Moore
pr R. F. Osgood
atty.

UNITED STATES PATENT OFFICE.

GEORGE MOORE, OF ROCHESTER, NEW YORK.

CORD ATTACHMENT FOR ARTIFICIAL LEGS.

SPECIFICATION forming part of Letters Patent No. 353,369, dated November 30, 1886.

Application filed September 15, 1886. Serial No. 213,641. (No model.)

*To all whom it may concern:*

Be it known that I, GEORGE MOORE, of the city of Rochester, in the county of Monroe and State of New York, have invented a certain new and useful Improvement in Cord Attachments for Artificial Legs; and I do hereby declare that the following is a full, clear, and exact description of the same, reference being had to the drawings accompanying this application.

My improvement relates to devices for securing cords, and is applicable to various uses where short lengths are required.

The invention consists of a cord attachment, consisting of a cord having looped ends, a bearing provided with a concave seat, a cylindrical pin passing through one of the loops and resting in the seat, a sheath inclosing the top of the cord, and a rubber spring around the sheath, as will be more fully described.

Figure 1:
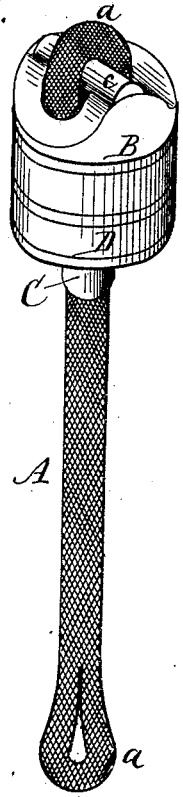
Figure 2:
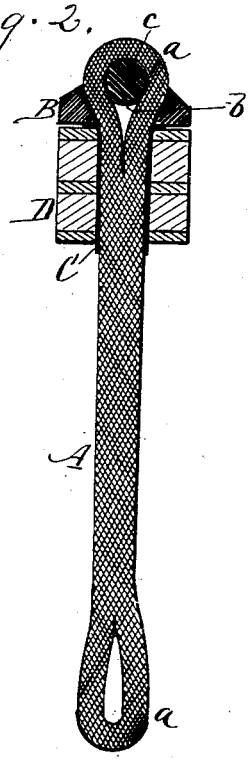
Figure 3:
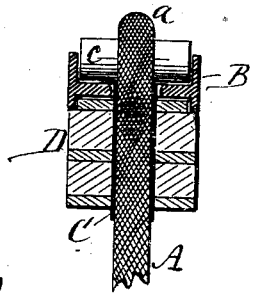
Figure 4:
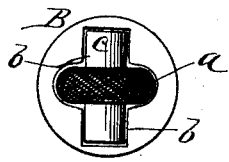

In the drawings, Figure 1 is a perspective view of the said device. Fig. 2 is a vertical cross-section of the same. Fig. 3 is a section of the upper portion at right angles to Fig. 2. Fig. 4 is a top end view.

A indicates the cord or ligament, which is usually of short length, and has at opposite ends loops *a a*.

B is the bearing at the top, the same consisting of a block with a central opening, through which the cord passes. In the top of the bearing is formed a concave seat, *b*, in which rests a cylindrical pin, *c*, that is inserted through the loop of the cord and sustains the same. The bottom of the bearing may be made plain and flat, as in Fig. 2, or with a countersink, as shown in Fig. 3.

C is a sheath that incloses the upper end of the cord below the bearing. Its upper end is turned over in flanged or cup form, as shown.

D is a rubber spring around the cord, resting on the sheath and under the bearing. It may be made in one piece or in several, as shown. Its object is to give elasticity to the attachment, the said spring resting on top of the support and the lower loop of the cord having the load attached thereto.

This device is applicable to many purposes, but more especially to use in artificial legs to connect the foot with the ankle. In such uses there is a rolling motion that is liable to wear out the cord unless some special provision is made. The construction described allows the tilting motion of the bearing B, and the consequent turn of the loop of the ligament on the pin with the minimum amount of wear. The loose connection of the pin and the employment of the spring facilitates the joint action without producing wear.

Having described my invention, what I claim as new is—

The cord attachment herein described, consisting of the cord having looped ends, the bearing provided with a concave seat, the cylindrical pin passing through one of the loops and resting in the seat, the sheath inclosing the top of the cord, and the rubber spring around the sheath, as herein shown and described.

In witness whereof I have hereunto signed my name in the presence of two subscribing witnesses.

GEORGE MOORE.

Witnesses:
R. F. OSGOOD,
WM. J. MCPHERSON.